United States Patent

Moss et al.

[11] 4,089,826
[45] May 16, 1978

[54] NEW CURING AGENTS FOR EPOXIDE RESINS

[75] Inventors: Noel Sydney Moss, Saffron Walden; Michael Peter Small, Cambridge, both of England

[73] Assignee: Ciba-Geigy Corporation, Ardsley, N.Y.

[21] Appl. No.: 626,594

[22] Filed: Oct. 28, 1975

[30] Foreign Application Priority Data

Nov. 6, 1974 United Kingdom ............... 47970/74

[51] Int. Cl.² ...................... C08G 59/50; C08L 63/00
[52] U.S. Cl. ............................ 260/29.2 EP; 252/182; 260/2 N; 260/2 EC; 260/18 EP; 260/47 EN; 260/47 EC; 260/28 R
[58] Field of Search ............ 260/2 N, 2 EC, 29.2 EP, 260/47 EN, 47 EC, 18 EP; 252/182

[56] References Cited

U.S. PATENT DOCUMENTS

| | | | |
|---|---|---|---|
| 2,864,775 | 12/1958 | Newey | 260/2 |
| 2,992,192 | 7/1961 | Ingberman | 260/2 |
| 3,349,053 | 10/1967 | Ashby | 260/29.2 |
| 3,449,281 | 6/1969 | Sullivan et al. | 260/29.2 |
| 3,639,344 | 2/1972 | Kinneman et al. | 260/47 EN |
| 3,763,100 | 10/1973 | Martin et al. | 260/47 EN |
| 3,860,541 | 1/1975 | Lehmann et al. | 260/18 PN |
| 3,963,666 | 6/1976 | Schreiber et al. | 260/37 |

FOREIGN PATENT DOCUMENTS

| | | |
|---|---|---|
| 1,258,454 | 12/1971 | United Kingdom. |
| 1,326,435 | 8/1973 | United Kingdom. |

*Primary Examiner*—Harold D. Anderson
*Assistant Examiner*—E. A. Nielsen
*Attorney, Agent, or Firm*—Vincent J. Cavalieri

[57] ABSTRACT

The agents comprise a mixture of
(A) an adduct of a polyethylenepolyamine or a polypropylenepolyamine with an aliphatic or aromatic diglycidyl ether and
(B) an aminoalcohol containing at least two aliphatic amino-hydrogen atoms, especially an adduct of a poly(aminoamide) with certain monoepoxides.
(A) has the formula

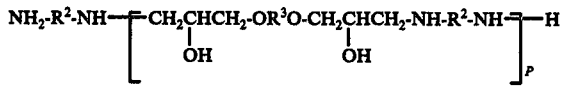

and
(B) the formula

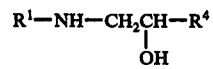

where
$R^1$ represents a $C_2$-$C_{60}$ hydrocarbon radical having amino or amido nitrogen in the chain, optionally substituted by amino or alcoholic hydroxy groups, being such that (B) contains at least two aliphatic amino-nitrogen hydrogen atoms,
$R^2$ represents

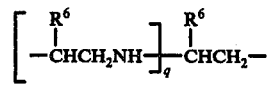

$R^3$ represents the residue (mol. weight 56 to 5,000) of an at least dihydric alcohol or phenol,
P is an integer of average value 1 to 1.5,
$q$ is an integer of 1 to 5,
$R^4$ represents a hydrogen atom, $C_1$-$C_3$ alkyl, phenyl, cresyl, chlorophenyl group, or a group $R^5OCH_2$—,
$R^5$ represents a $C_1$-$C_{18}$ residue of a monohydric aliphatic, cycloaliphatic, or araliphatic alcohol or of a monohydric phenol and
$R^6$ is a hydrogen atom or a methyl group.

9 Claims, No Drawings

NEW CURING AGENTS FOR EPOXIDE RESINS

DETAILED DISCLOSURE

This invention relates to new curing agents for epoxide resins, to curable compositions containing them, to the cured products obtainable therefrom, and to a method of coating a substrate with the curable compositions.

It is known that poly(aminoamides), containing free amino groups and prepared from alkylene polyamines and polymerised unsaturated natural fatty acids, can be used to cure epoxide resins. It is also known from British Patent Specification No. 988,484 to cure epoxide resins with adducts formed from these poly(aminoamides). While it has been proposed to form curable aqueous dispersions of such adducts and epoxide resins, the results obtained are frequently unsatisfactory. Thus, in some cases the adducts, especially those prepared from aromatic polyepoxides, are semisolid and are not readily dispersible in aqueous media, while aqueous dispersions which contain an aromatic epoxide resin and an adduct prepared from an aliphatic polyepoxide often undesirably exhibit thixotropic behaviour.

It is also known, from British Patent Specification No. 1,122,810, to prepare curable compositions by mixing an aqueous emulsion of an epoxide resin with an aqueous emulsion of a poly(aminoamide) or of an adduct of a polyalkylene polyamine and a liquid epoxide resin, or of a mixture of these two. Such compositions suffer from the drawback of requiring two separate emulsions to be prepared, which then are to be combined when required. Such compositions always contain emulsifying agents which may interfere with the properties of the cured product.

It is further known, from British Patent Specification No. 1,131,543, to prepare curable aqueous dispersions containing an epoxide resin and, as curing agent, an adduct of a mono- or polyepoxide with a stoichiometric excess of a poly(aminoamide). These compositions, however, tend to be slow to cure at room temperature.

Finally, it is known from British Patent Specification No. 1,326,435 to prepare curable compositions comprising a curable liquid epoxide resin, water, and an adduct of an aliphatic diglycidyl ether and an amine. These compositions also tend to be slow to cure at room temperature.

We have now discovered that, by using as the curing agent for the epoxide resin a mixture of an adduct of certain aliphatic polyamines with an aliphatic or aromatic diglycidyl ether and also an aminoalcohol, which may be an adduct of an amine, especially of a poly(aminoamide), with certain monoepoxides, curable compositions may be obtained in which the disadvantages mentioned above are substantially avoided. Aqueous solutions of such mixtures also serve as emulsifying agents for liquid or solid epoxide resins and it is thus possible to obtain curable emulsions of such resins without adding further emulsifying agents. Such emulsions, which are thinnable with water to a range of viscosities, cure rapidly at room temperature to give chemically-resistant, hard, glossy finishes, and are therefore particularly suitable for use as coatings. When these emulsions incorporate an epoxide resin which is a solid at room temperature they have the advantage of becoming touch-dry by evaporation of the water. Thus they can be made to solidify quickly without a corresponding sacrifice in pot life.

Accordingly, the present invention provides a mixture, suitable for use as a curing agent for epoxide resins, comprising (A) an adduct of the formula

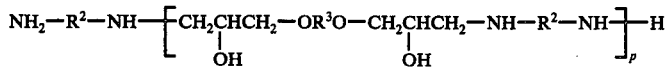

and (B) a compound of the formula

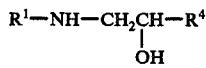

where
R¹ represents a hydrocarbon radical containing from 2 to 60 carbon atoms, which may be substituted by primary, secondary, or tertiary amino groups or by hydroxy groups and which contains amino or amido nitrogen atoms in the chain, being such that (B) contains at least two hydrogen atoms directly attached to aliphatic amino nitrogen, R² represents a group of formula

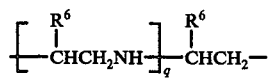

where
R⁶ is a hydrogen atom or a methyl group, and
q is an integer of 1 to 5,
R³ represents the residue of an at least dihydric alcohol or at least dihydric phenol after removal of two hydroxyl groups and having a molecular weight of from 56 to 5,000, preferably of from 150 to 500,
p is an integer such that its average value is from 1 to 1.5,
R⁴ represents a hydrogen atom, an alkyl group of 1 to 3 carbon atoms, a phenyl group, which may be substituted by a methyl group or by a chlorine atom, or a group of formula

where R⁵ represents the residue of a monohydric aliphatic, cycloaliphatic, or araliphatic alcohol or of a monohydric phenol after removal of the sole hydroxyl group and having from 1 to 18 carbon atoms, especially a saturated aliphatic hydrocarbon group, which may be substituted by chlorine, or a mononuclear aryl or aralkyl hydrocarbon group which may be substituted by chlorine. Specific examples of groups R⁵ are n-butyl, iso-octyl, phenyl, o-, m-, and p-chlorophenyl, o-, m-, and p-cresyl, and benzyl groups.

Preferably the mixture is in aqueous solution.

Also included within the scope of the present invention are curable compositions comprising an epoxide resin having more than one terminal 1,2-epoxide group per average molecule and the aforesaid mixture as curing agent, the epoxide resin preferably being as an oil-inwater emulsion in an aqueous solution of the aforesaid mixture.

The adducts (A) are conveniently prepared by reaction of a diglycidyl ether of formula

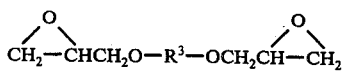   V with up to two molecular equivalents of an amine of formula

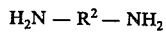   VI where $R^2$ and $R^3$ are as hereinbefore defined. This reaction may be carried out at ambient or elevated temperature, preferably at 60° to 150°, for from ½ hour to about 12 hours, depending upon the reaction temperature. If, on completion of the reaction, water is added, a stable, clear or only slightly hazy solution is formed.

The compounds (B) may be prepared by a similar method to the adducts of formula I, by reaction of a monoepoxide of formula VII

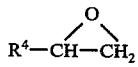   VII where $R^4$ is as hereinbefore defined, instead of a diglycidyl ether of formula V with at least one molecular equivalent of an amine of formula

   VIII

The adduct (A) and the compound (B) may be made separately or partly or entirely together.

Preferred amines of formula VI are polyalkylene polyamines such as triethylenetetramine, tetraethylenepentamine, pentaethylenehexamine, and dipropylenetriamine.

The preferred amines of formula VIII are the aforesaid polyalkylene polyamines and also their poly(aminoamides) with carboxylic acids which contain up to 55 carbon atoms, such as the saturated fatty acids palmitic acid and stearic acid, the unsaturated fatty acids elaidic acid, linoleic acid, ricinoleic acid, eleostearic acid, dimers and trimers of such unsaturated acids, and also the copolymers of such unsaturated acids with aromatic vinyl compounds such as styrene. Especially preferred poly(aminoamides) are those having an amine value of between 85 and 450 mg KOH/g.

Preferred diglycidyl ethers of formula V are those obtainable by the interaction of a dihydric or polyhydric alcohol or a dihydric or polyhydric phenol with epichlorohydrin or a related substance (for example, glycerol dichlorohydrin) under alkaline conditions or, alternatively, in the presence of an acidic catalyst with subsequent treatment with alkali. These compounds may be derived from alcohols such as propane-1,3-diol, pentane-1,5-diol, hexane-1,6-diol, hexane-2,4,6-triol, glycerol, 1,1,1-trimethylolpropane, pentaerythritol, sorbitol, quinitol, 1,1-bis(hydroxymethyl)cyclohex-3-ene, bis(4-hydroxycyclohexyl)methane, 2,2-bis(4-hydroxycyclohexyl)propane, and N-aryldialkanolamines such as N-phenyldiethanolamine and especially from ethylene glycol and poly(oxyethylene) glycols, propylene glycol and poly(oxypropylene) glycols, butane-1,4-diol, and poly(oxytetramethylene) glycols, and from dihydric or polyhydric phenols such as resorcinol, catechol, hydroquinone, bis(4-hydroxyphenyl)methane, 1,1,2,2-tetrakis(4-hydroxyphenyl)ethane, 4,4'-dihydroxydiphenyl, bis(4-hydroxyphenyl)sulphone, and especially 2,2-bis(4-hydroxyphenyl)propane (bisphenol A), bis(4-hydroxyphenyl)methane, and their chlorine or bromine-containing or C-alkylated analogues.

Preferably, therefore, $R^3$ denotes a group of formula

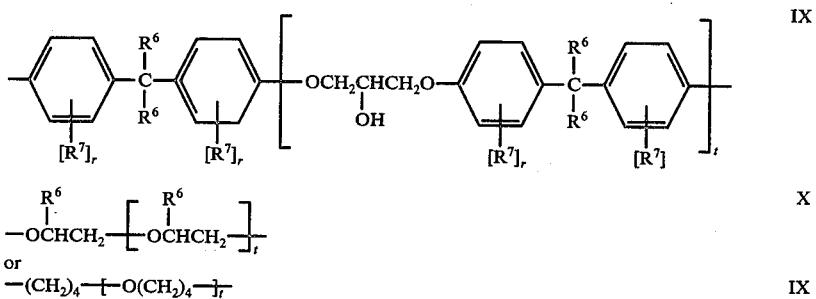

where
$R^6$ has the meaning previously assigned,
$R^7$ is a chlorine or bromine atom or an alkyl group of 1 to 9 carbon atoms,
$r$ is zero, 1, or 2, and
$t$ is zero or a positive integer such that the molecular weight of the residue $R^3$ is at least 56 and at most 5,000.

Preferred monoepoxides of formula VII are alkyl or aryl glycidyl ethers containing a total of 5 to 15 carbon atoms, such as n-butyl glycidyl ether, iso-octyl glycidyl ether, phenyl glycidyl ether, propylene oxide, and styrene oxide. (The iso-octyl glycidyl ether of commerce comprises some two-thirds 4,5-dimethylhexyl, 3,5-dimethylhexyl, and 3,4-dimethylhexyl glycidyl ethers and about one-quarter 4-methylheptyl, 5-methylheptyl, and 6-methylheptyl glycidyl ethers, the balance being largely various other branched $C_8$ alkyl glycidyl ethers.)

As the epoxide resin component of the curable compositions of the present invention there are used, as already mentioned, those polyepoxides which have more than one 1,2-terminal epoxide group per average molecule, especially those in which the terminal epoxide groups are 2,3-epoxypropyl groups directly attached to oxygen, nitrogen, or sulphur atoms. Examples of such include polyglycidyl esters obtainable by the reaction of a substance containing two or more carboxylic acid groups with epichlorohydrin or glycerol dichlorohydrin in the presence of an alkali. Such polyglycidyl esters may be derived from aliphatic dicarboxylic acids, e.g., oxalic acid, succinic acid, sebacic acid, or dimerised or trimerised linoleic acid, and from cycloaliphatic carboxlic acids such as hexahydrophthalic acid, tetrahydrophthalic acid, and 4-methyltetrahydrophthalic acid, and from aromatic dicarboxylic acids such as phthalic acid, isophthalic acid, and terephthalic acid.

Other epoxide resins which may be used include the diglycidyl ethers already mentioned as suitable for use as the compound of formula V, and also the ethers, containing more than two glycidyl ether groups, of alcohols such as hexane-2,4,6-triol, glycerol, sorbitol, and pentaerythritol.

There may further be employed N-glycidyl compounds such as are, for example, obtained by the dehydrochlorination of the reaction products of epichlorohydrin and primary or di-secondary amines such as aniline, n-butylamine, bis(4-aminophenyl)methane, and bis(4-methylaminophenyl)methane. Other poly(N-glycidyl) compounds that may be used include triglycidyl isocyanurate, and N,N'-diglycidyl derivatives of cyclic alkylene ureas such as ethyleneurea and 1,3-propyleneurea, and of hydantoins such as 5,5-dimethylhydantoin.

Other suitable epoxide resins include any of the above having 1 to 4 hydrogen atoms which do not form part of a glycidyl group replaced by bromine or chlorine atoms, or any of the above in which a hydroxyl group is replaced by a siloxanoxy group.

Especially suitable epoxide resins are those obtained by the reaction of 2,2-bis(4-hydroxyphenyl)propane with epichlorohydrin and having an epoxide content of about 2.0 to 5.88 epoxide equivalents per kilogram.

The ratio of adduct (A) to compound (B) may vary within very wide limits, depending upon the nature of the components, the rate at which curing is required, and the desired pot life of the emulsion with an epoxide resin. Where a faster curing rate is required, the proportion of adduct (A) is increased and when a slower curing rate is required it is decreased. Generally, the weight ratio of adduct (A) to compound (B) is from 1:0.1 to 1:4, and preferably from 1:0.5 to 1:4.

The total amount of the two components (A) and (B), when used in solution, is generally 5 to 90% by weight. It is more convenient, of course, to store a concentrated solution of these compounds, e.g., one containing at least 30% by weight of them, and to dilute this solution with water to the required viscosity when it is used. If desired, the solution may also contain a small amount, generally up to 3% by weight, of a monobasic organic or inorganic acid which serves to inhibit separation of the emulsion, to enhance the solubility of the curing agent in water, and to increase the usable life of the emulsion. Acetic acid is preferred for this purpose but other acids, such as formic or hydrochloric acids, may be used.

The curable compositions may also contain an accelerator for the hardening action. Suitable accelerators are compounds containing at least one tertiary amino nitrogen atom and a phenolic hydroxyl group, Mannich bases such as 2,4,6-tris(dimethylaminomethyl)phenol and 2-(dimethylaminomethyl)-4-nonylphenol being particularly preferred. Other accelerators may, however, be used. The curable compositions may further contain diluents or viscosity-reducing agents for the epoxide resin or the hardening agent such as phenyl glycidyl ether, but especially a glycidyl ether of an aliphatic monohydric alcohol containing from 4 to 10 carbon atoms, such as n-butyl glycidyl ether and iso-octyl glycidyl ether, or a diglycidyl ether of an aliphatic dihydric alcohol having from 2 to 6 carbon atoms, such as butene-1,4-diol diglycidyl ether. The compositions may also contain pigments such as titanium dioxide, plasticising agents such as polypropylene glycols, extenders such as low viscocity coal-tar fractions, flow-control agents, and powdered polymers such as polytetrafluoroethylene. They may also contain, as an adhesion promoter, a silane containing a reactive group, especially 3-(glycidoxy)propyltrimethoxysilane.

The ratio of curing agent to curable epoxide resin in the curable compositions of the present invention will vary within wide limits, depending upon such factors as the total active hydrogen content of the components (A) and (B) and the epoxide group content of the epoxide resin. Optimum proportions may readily be determined by routine experiment; generally, however, sufficient of the mixture is used to supply from 0.75 to 1.25 aliphatic amino-hydrogen equivalents per 1,2-epoxide group of the resin.

The present invention also provides cured products obtained by curing the curable compositions of the present invention. The cured products may be used to form coatings on, for example, metal surfaces, to prevent corrosion.

Because of their excellent adhesion to concrete, stone, and similar materials, the curable compositions of the present invention are also useful for fixing small stones, chippings, and the like to concrete and similar substrates in the preparation of terrazzo and other decorative finishes.

This invention therefore further provides a method of coating a substrate which comprises applying a curable composition of the present invention to the substrate, which is typically of metal or concrete, and allowing or causing the composition to cure.

The following Examples illustrate the invention. Unless otherwise indicated, all parts are by weight and temperatures are in degrees Celsius.

The epoxide resins used were as follows:

Epoxide Resin I denotes a polyglycidyl ether of 2,2-bis(4-hydroxyphenyl)propane which is solid at room temperature, having an epoxide content of 1.9 to 2.2 equiv./kg and a molecular weight of approximately 1000.

Epoxide Resin II denotes a liquid polyglycidyl ether of 2,2-bis(4-hydroxyphenyl)propane, having an epoxide content of 5.0 to 5.2 equiv./kg.

Epoxide Resin III denotes a polyglycidyl ether of 2,2-bis(4-hydroxyphenyl)propane, advanced with 2,2-bis(4-hydroxyphenyl)propane; it has an epoxide content of 3.6 to 4.3 equiv./kg, a molecular weight of approximately 500, and is a semisolid at room temperature.

Epoxide Resin IV denotes a solid resin similar to Epoxide resin III but having an epoxide content of 0.5 equiv./kg and a molecular weight of approximately 4000.

Epoxide Resin V is butane-1,4-diol diglycidyl ether.

Epoxide Resin VI denotes a mixture of 40 parts of Epoxide resin V and 60 parts of a solid resin similar to Epoxide resin III but having an epoxide content of 2.2 to 2.5 equiv./kg and a molecular weight of approximately 750.

The poly(aminoamides) used in the preparation of the monoepoxide adducts were as follows:

AMIDE I

This denotes a polyaminoamide containing an imidazoline ring, made from a mixture of predominantly $C_{18}$ fatty acids and tetraethylenepentamine according to the method given in British Patent Specification No. 865,656, and having an amine number of 350 to 380 mg KOH/g. It was obtained under the designation "Synolide 960" from Cray Valley Products Limited, Orpington, Kent, England.

AMIDE II

This denotes a polyaminoamide made from a mixture of predominantly $C_{18}$ fatty acids and tetraethylenepentamine, prepared by heating these at about 200° in order to limit the formation of imidazoline rings, the product having an amine value of 425–450 mg KOH/g. It was likewise obtained from Cray Valley Products Limited, under the designation "Genamid 250".

AMIDE III

This denotes a polyaminoamide made from dimerised linoleic acid and triethylenetetramine and is described as Sample 3 of Example 2 in British Patent Specification No. 847028. It was obtained under the designation "Versamid 140" from Cray Valley Products Limited.

AMIDE IV

This denotes an aminoamide, having an amine value of 400–430 mg KOH/g, of the general formula

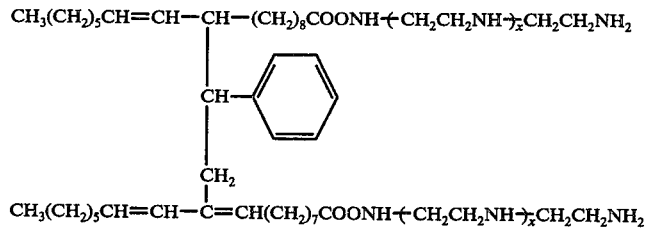

where $x$ has an average value between 1 and 2. It was obtained from J. Bibby and Sons Limited, Liverpool, England, under the designation "Merginamide L 410".

The adducts were made as follows:

DIEPOXIDE ADDUCT I

Tetraethylenpentamine (100 parts) was heated to 70° and added thereto over 2 hours was Epoxide resin II (100 parts) the temperature being kept between 70° and 120°. When the addition had been completed the mixture was cooled to give Diepoxide Adduct I.

DIEPOXIDE ADDUCTS II-VII

These were obtained in a similar manner to Diepoxide Adduct I but commencing with the following:

| Diepoxide Adduct II | tetraethylenepentamine | 67 | parts |
| | Epoxide resin I | 50 | parts |
| | Epoxide resin II | 43.5 | parts |
| | Iso-octyl glycidyl ether | 6.5 | parts |
| Diepoxide Adduct III | tetraethylenepentamine | 38 | parts |
| | diethylenetriamine | 20 | parts |
| | Epoxide resin III | 100 | parts |
| Diepoxide Adduct IV | tetraethylenepentamine | 75 | parts |
| | Epoxide resin IV | 60 | parts |
| | Epoxide resin V | 40 | parts |
| Diepoxide Adduct V | tetraethylenepentamine | 85 | parts |
| | Epoxide resin VI | 100 | parts |
| Diepoxide Adduct VI | triethylenetetramine | 60 | parts |
| | Epoxide resin III | 93 | parts |
| | iso-octyl glycidyl ether | 7 | parts |
| Diepoxide Adduct VII | tetraethylenepentamine | 78 | parts |
| | Epoxide resin III | 93 | parts |
| | iso-octyl glycidyl ether | 7 | parts |

MONOEPOXIDE ADDUCT I

This was prepared by mixing the following at room temperature

| Amide II | 70 parts |
| Amide III | 30 parts |
| phenyl glycidyl ether | 18 parts | heating for 2 hours at a temperature between 70° and 120°, and then cooling.

MONOEPOXIDE ADDUCT II

This was prepared in the same way from

| Amide I | 55 parts |
| phenyl glycidyl ether | 10 parts |

MONOEPOXIDE ADDUCT III

Propylene oxide (24 parts) was added dropwise and with stirring to Amide IV (408 parts) at 21°. When the addition had been completed the mixture was heated to 150° during 1 hour and maintained at that temperature for a further 30 minutes, then cooled to give Monoepoxide Adduct III.

MONOEPOXIDE ADDUCT IV

This was prepared by mixing the following at room temperature

| triethylenetetramine | 146 parts |
| iso-octyl glycidyl ether | 200 parts | and heating the mixture at about 100° for 2 hours.

MONOEPOXIDE ADDUCT V

This was prepared in the same way as Monoepoxide Adduct IV but starting from

| triethylenetetramine | 146 parts |
| styrene oxide | 120 parts. |

MONOEPOXIDE ADDUCT VI

This was prepared in the same way as Monoepoxide Adduct IV but starting from

| tetraethylenepentamine | 189 parts |
| phenyl glycidyl ether | 150 parts. |

MONOEPOXIDE ADDUCT VII

This was prepared in the same way as Monoepoxide Adduct IV but starting from

| | |
|---|---|
| Amide II | 70 parts |
| Amide III | 30 parts |
| n-butyl glycidyl ether | 18 parts. |

EXAMPLE 1

Diepoxide Adduct I (35 parts) was mixed with Monoepoxide Adduct II (65 parts). Water (10 parts) was then added, together with 2 parts of glacial acetic acid. The resultant mixture was a clear, stable solution which could be diluted further with water if desired.

EXAMPLE 2

The solution from Example 1 (75 parts) was diluted with water (90 parts) and added to Epoxide resin III (100 parts) to give a stable emission. Samples of this emulsion were applied as a thin coating to strips of steel, aluminum, and glass. The coatings ahered well, and dried within 4 hours at room temperature. After 14 days at room temperature the coatings, which had a hard, semi-gloss finish, were found to be resistant to attack by diesel oil, water, 20% aqueous NaOH, petrol, and dilute detergent.

EXAMPLES 3-7

Example 1 was repeated, using the adducts and acids shown in Table I. In all cases the resultant solutions were clear or very slightly cloudy and were water-dilutable.

TABLE I

| | Diepoxide adduct | | Monoepoxide adduct | | Acid | | Water |
|---|---|---|---|---|---|---|---|
| Ex. | Designation | Parts | Designation | Parts | Name | Parts | Parts |
| 3 | III | 30 | III | 70 | acetic | 2 | 15 |
| 4 | II | 65 | I | 35 | formic | 2 | 40 |
| 5* | IV | 35 | III | 65 | acetic | 2 | 20 |
| 6 | V | 25 | II | 75 | acetic | 2 | 12 |
| 7 | VI | 65 | I | 35 | acetic | 2 | 30 |

*This solution also contained 5 parts of 2-(dimethylaminomethyl)-4-nonylphenol as curing accelerator.

EXAMPLE 8

Epoxide Resin III (100 parts) and titanium dioxide (100 parts) were mixed together and 75 parts of the solution from Example 3 were added. Mixing was continued to give a stable emulsion, and water (100 parts) was added to give the desired viscosity.

The resultant emulsion had a usable life of three hours and, when applied as a coating to aluminium or mild steel panels, was touch-dry within 5 hours at 20°, giving a glossy white surface.

EXAMPLE 9

75 parts of the solution from Example 4 was mixed with 72 parts of "Orgol Tar", a low-viscosity tar fraction available from The British Steel Corporation, Chemicals Division, Orgreave, Sheffield, England. Water (100 parts) was added slowly to the mixture, stirring continuously, and finally 100 parts of Epoxide resin III was blended in. The resultant emulsion, which could be diluted further with water if desired, was applied to mild steel or aluminum panels and it dried within 4 hours at ambient temperature to a hard, black, semi-glossy film which was resistant to attack by solvents.

EXAMPLE 10

60 parts of Epoxide resin II were mixed with 25 parts of the solution from Example 5. The resultant emulsion was diluted with water (75 parts) and applied to a mild steel surface. It dried within 4 hours to a hard, semi-glossy film which was resistant to attack by solvents.

Replacing the solution used in this Example by the solutions prepared in Examples 6 or 7 gave similar results.

EXAMPLES 11-14

Example 1 was repeated, using 2 parts of acetic acid and 50 parts of water. The other constituents are shown in Table II. In all cases the resultant solutions were clear or slightly cloudy and were water-dilutable.

TABLE II

| | Diepoxide adduct | | Monoepoxide adduct | |
|---|---|---|---|---|
| Example | Designation | Parts | Designation | Parts |
| 11 | VII | 50 | IV | 50 |
| 12 | VII | 50 | V | 50 |
| 13 | VII | 50 | VI | 50 |
| 14 | VIII | 50 | VII | 50 |

EXAMPLES 15-18

Example 8 was repeated but the solution from Example 3 was replaced by the solutions from Examples 11 to 14. The amounts of materials used, and the properties of the coatings obtained, are given in Table III.

TABLE III

| Ex. | Solution from Example | Parts | Water (parts) | Usable life (minutes) | Touch dry time (hours at 20°) | Appearance |
|---|---|---|---|---|---|---|
| 15 | 11 | 54 | 200 | 60 | 4 | glossy |
| 16 | 12 | 47 | 150 | 20 | 3 | semi-glossy |
| 17 | 13 | 48 | 150 | 40 | 3 | glossy |
| 18 | 14 | 75 | 150 | 60 | 4½ | semi-glossy |

We claim:
1. An aqueous solution comprising:
(A) an adduct of the formula

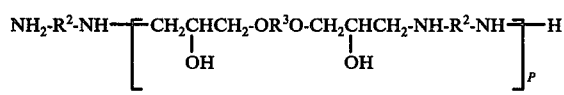

and
(B) a compound of the formula

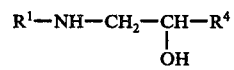

where
R¹ represents a radical containing up to 60 carbon atoms of a polyalkylene poly(aminoamide), being such that (B) contains at least two hydrogen atoms directly attached to aliphatic amino nitrogen,
R² represents a group of formula where 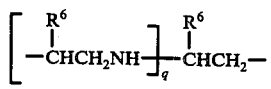

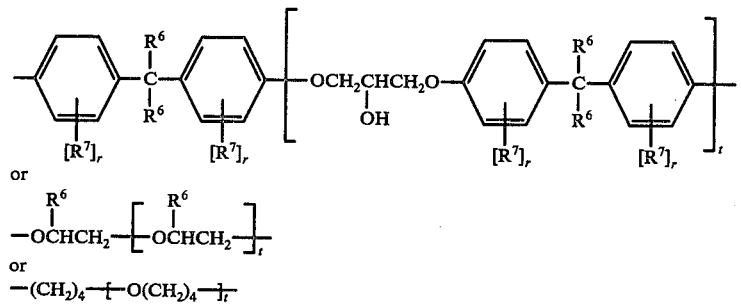
or $$-OCHCH_2 \begin{matrix} R^6 \\ | \end{matrix} \left[ -OCHCH_2 \begin{matrix} R^6 \\ | \end{matrix} \right]_t$$

or $$-(CH_2)_4-[-O(CH_2)_4-]_t-$$

$R^6$ is a hydrogen atom or a methyl group, and
$g$ is an integer of from 1 to 5,
$R^3$ represents the residue of an at least dihydric alcohol or at least dihydric phenol after removal of two hydroxyl groups, and having a molecular weight of from 56 to 5,000, especially from 150 to 500,
$p$ is an integer such that its average value is from 1 to 1.5,
$R^4$ represents a hydrogen atom, an alkyl group of 1 to 3 carbon atoms, a phenyl group, which may be substituted by a methyl group or by a chlorine atom, or a group $$R^5OCH_2-$$

where $R^5$ represents the residue of a monohydric aliphatic, cycloaliphatic, or araliphatic alcohol or or a monohydric phenol after removal of the sole hydroxyl group and having from 1 to 18 carbon atoms, and
(C) water, (A) and (B) together comprising from 5 to 90% by weight of the solution.

2. The mixture of claim 1, in which $R^5$ represents a saturated aliphatic hydrocarbon group, a saturated aliphatic hydrocarbon group containing chlorine, a mononuclear aryl or aralkyl hydrocarbon group, or a mononuclear aryl or aralkyl hydrocarbon group containing chlorine.

3. The mixture of claim 2, in which $R^5$ represents an n-butyl, iso-octyl, phenyl, o-, m-, or p-chlorophenyl, o-, m-, or p-cresyl, or benzyl group.

4. The mixture of claim 1, in which $R^3$ denotes a group of formula where
$R^6$ is as defined in claim 1,
$R^7$ is a chlorine or bromine atom or an alkyl group of 1 to 9 carbon atoms,
$r$ is zero, 1, or 2, and
$t$ is zero or a positive integer such that the molecular weight of the residue $R^3$ is at least 56 and at most 5,000.

5. The mixture of claim 1, in which the ratio of adduct (A) to compound (B) by weight is from 0:1.1 to 1:4.

6. A curable composition comprising a mixture as claimed in claim 1 and an epoxide resin having more than one terminal 1,2-epoxide group directly attached to oxygen, nitrogen, or sulphur atoms, per average in the molecule.

7. The composition of claim 6, which also contains an accelerator for curing the epoxide resin by the said mixture.

8. The composition of claim 6, in which the adduct (A) and the compound (B) together supply from 0.75 to 1.25 aliphatic amino-hydrogen equivalents per 1,2-epoxide group of the epoxide resin.

9. The composition of claim 6, in which the epoxide resin is an oil-in-water emulsion in an aqueous solution of adduct (A) and compound (B).

* * * * *